United States Patent
Bang et al.

(10) Patent No.: US 8,477,880 B2
(45) Date of Patent: Jul. 2, 2013

(54) METHOD AND APPARATUS FOR SIGNAL DETECTION BASED ON MMSE IN MIMO COMMUNICATION SYSTEM

(75) Inventors: Young Jo Bang, Daejeon (KR); Young Ha Lee, Daejeon (KR); Jung Pil Choi, Daejeon (KR); Hoon Lee, Daejeon (KR); Seungjae Bahng, Daejeon (KR); Youn Ok Park, Daejeon (KR); Il Min Kim, Suwon-si (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 801 days.

(21) Appl. No.: 12/629,433

(22) Filed: Dec. 2, 2009

(65) Prior Publication Data

US 2010/0142654 A1    Jun. 10, 2010

(30) Foreign Application Priority Data

Dec. 5, 2008    (KR) .......................... 10-2008-0123303
Nov. 17, 2009    (KR) .......................... 10-2009-0111133

(51) Int. Cl.
*H04L 27/08*    (2006.01)

(52) U.S. Cl.
USPC ........... 375/340; 375/324; 375/341; 375/342; 375/346; 375/351

(58) Field of Classification Search
USPC ................. 375/316, 324, 340, 341, 346, 351, 375/342

See application file for complete search history.

(56) References Cited

U.S. PATENT DOCUMENTS

| | | | | |
|---|---|---|---|---|
| 8,169,978 | B2 * | 5/2012 | Sheng et al. | 370/335 |
| 8,345,806 | B2 * | 1/2013 | Jung et al. | 375/347 |
| 2006/0215781 | A1 * | 9/2006 | Lee et al. | 375/267 |
| 2007/0268813 | A1 * | 11/2007 | Muquet et al. | 370/203 |
| 2008/0069262 | A1 | 3/2008 | Prasad et al. | |
| 2008/0279299 | A1 * | 11/2008 | Reuven et al. | 375/267 |

FOREIGN PATENT DOCUMENTS

| | | |
|---|---|---|
| KR | 1020060102050 A | 9/2006 |
| KR | 10-2008-0021323 A | 3/2008 |

OTHER PUBLICATIONS

Heunchul Lee et al., New Approach for Coded Layered Space-Time OFDM Systems, Proc. ICC 2005, May 2005, pp. 608-612.

* cited by examiner

*Primary Examiner* — Sophia Vlahos
(74) *Attorney, Agent, or Firm* — Jefferson IP Law, LLP

(57) ABSTRACT

In a multi-input multi-output communication system receiving signals transmitted through a plurality of transmission antennas by using a plurality of reception antennas, a matrix determining a position of a symbol to be detected from a received signal is calculated at a first symbol detection step, and from the subsequent step, a matrix at the current step is acquired through a simple relationship from the matrix calculated at the previous step to determine a position of a symbol to be detected.

11 Claims, 5 Drawing Sheets

FIG. 2

| Constellation | Φ | $\{L_{j,i}\}$ |
|---|---|---|
| QPSK | 4 | $L_{j,2} = 4$ |
| | | $\{L_{j,2}: j=1,2,3,4\} = \{4,1,1,1\}$ |
| | | $\{L_{j,3}: j=1,2,3,5,9\} = \{3,1,1,1,1,1,1\}$ |
| | | $\{L_{j,3}: j=1,2,3,5,9,17,33\} = \{3,1,1,1,1,1,1\}$ |
| 16-QAM | 6 | $L_{11} = 4$ |
| | | $\{L_{j,2}: j=1,2,3,4\} = \{4,1,1,1\}$ |
| | | $\{L_{j,3}: j=1,2,3,4,17,33,49\} = \{4,1,1,1,1,1,1\}$ |
| | | $\{L_{j,4}: j=1,2,3,4,17,33,49,257,513,769\} = \{4,1,1,1,1,1,1,1,1,1\}$ |
| 16-QAM | 9 | $L_{11} = 4$ |
| | | $\{L_{j,2}: j=1,2,3,4\} = \{4,3,3,1\}$ |
| | | $\{L_{j,3}: j=1,2,3,4,17,18,19,33,34,35,49\} = \{4,3,3,1,3,1,1,3,1,1,1\}$ |
| | | $\{L_{j,4}: j=1,2,3,4,17,18,19,33,34,35,49,257,258,259,273,289,513,$ $514,515,529,545,769\} = \{4,3,3,1,3,1,1,3,1,1,1,3,1,1,1,3,1,1,1,1,1\}$ |

METHOD AND APPARATUS FOR SIGNAL DETECTION BASED ON MMSE IN MIMO COMMUNICATION SYSTEM

CROSS-REFERENCE TO RELATED APPLICATION

This application claims priority to and the benefit of Korean Patent Application Nos. 10-2008-0123303 and 10-2009-0111133 filed in the Korean Intellectual Property Office on Dec. 5, 2008, and Nov. 17, 2009, respectively, the entire contents of which are incorporated herein by reference.

BACKGROUND OF THE INVENTION (a) Field of the Invention

The present invention relates to a method and an apparatus for signal detection, and more particularly, to a method and an apparatus for signal detection in a multi-input multi-output wireless communication system.

(b) Description of the Related Art

In a wireless communication system, since a bandwidth is very limitative, it is very important to support high data transmission rate to various users by using only the limitative bandwidth. A multi-input multi-output (hereinafter referred to as "MIMO") communication system has several antennas on a transmission terminal and a reception terminal, and simultaneously transmits multiple signals by using the same wireless band on the transmission terminal in order to meet the above-mentioned requirement. As a result, it is possible to remarkably improve the transmission rate without increasing the bandwidth.

In the MIMO communication system, the transmitter transmits different data by using a plurality of antennas, and in this case, a signal of each antenna experiences independent fading. Therefore, the receiver should differentiate transmitted data through proper signal processing. At this time, signals transmitted from another antenna are overlapped and thus cause inter-antenna interference (IAI), which is an interference factor that increases errors.

As a method of detecting the transmitted data while removing the interference factors, a maximum likelihood (hereinafter referred to as "ML") detection method is used. This method shows the best performance, but is very high in complexity of a signal detecting process. In particular, as the number of transmission antennas increases, the complexity increases exponentially.

As a result, in case of actual system implementation, a signal detection method that does not have high complexity is used. As the signal detection method, a minimum mean square error-successive interference cancellation (hereinafter referred to as "MMSE-SIC") scheme is used. In the MMSE-SIC scheme, when one symbol is first detected in transmission data, that is, a symbol is detected by the MMSE scheme, the symbol is excluded from the reception signal and the MMSE scheme is applied to the remaining symbols. The scheme is still lower in complexity but is worse in performance than the ML scheme.

An improved MMSE-SIC scheme has been recently proposed in order to solve the problem of deterioration in performance. The improved MMSE-SIC scheme should determine which symbol of the remaining symbols will be detected next whenever the symbol is detected. For this purpose, since a predetermined matrix determining the detection order should be calculated, the complexity is still low. Further, the improved MMSE-SIC scheme still has a large difference from the ML scheme in performance.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus that can accurately and effectively detect a signal in a MIMO communication system.

Further, the present invention has been in an effort to provide a method and an apparatus for signal detection that provides high performance with low complexity.

An exemplary embodiment of the present invention provides a method for signal detection in a multi-input multi-output communication system receiving signals transmitted through a plurality of transmission antennas by using a plurality of reception antennas, that includes: detecting symbol candidate vectors with respect to transmission symbols transmitted through the transmission antennas on the basis of the signals received through the reception antennas; calculating Euclidean distances with respect to all the detected symbol vectors; and detecting a vector having the minimum Euclidean distance among the symbol candidate vectors for the transmission symbols as the final symbol vector for the corresponding transmission symbol. Herein, the detecting symbol candidate vectors includes determining a symbol to be detected at present; and selecting symbol candidates of a predetermined number and detecting the selected symbol candidates as the symbol candidate vector on the basis of error expected values of the symbol candidates among all transmissible symbol candidates on the constellation with respect to the determined symbol.

Further, another embodiment of the present invention provides a method for signal detection in a multi-input multi-output communication system receiving signals transmitted through a plurality of transmission antennas by using a plurality of reception antennas that includes: determining a symbol to be detected at the present in order to detect the transmission symbols transmitted through the transmission antennas, on the basis of the signals received through the reception antennas; and selecting at least one symbol candidate vector from among all the transmissible symbol candidates on a constellation with respect to the determined symbol. Herein, the determining a symbol determines the symbol based on a reception filter matrix for determining a position of a symbol and a reordering matrix calculated according to a channel matrix representing channel characteristics between the reception antenna and the transmission antenna.

Yet another embodiment of the present invention provides an apparatus for signal detection in a multi-input multi-output communication system receiving signals transmitted through a plurality of transmission antennas by using a plurality of reception antennas, including: a detection order determination unit determining a symbol to be currently detected in order to detect the transmission symbols transmitted through the transmission antennas on the basis of the signals received through the reception antennas; a symbol candidate selection unit selecting symbol candidates of optimal numbers and detecting the selected symbol candidates as the symbol candidate vector on the basis of error expected values of the symbol candidates from among all transmissible symbol candidates on the constellation with respect to the determined symbol; and a symbol detection unit detecting a vector having the minimum Euclidean distance among the symbol candidate vectors when the symbol candidate vectors of the optimal number are selected for all transmission symbols with respect to the detection order determination unit and the symbol candidate selection unit.

BRIEF DESCRIPTION OF THE DRAWINGS

FIG. 2 is an exemplary diagram showing the numbers $L_{j,i}$ selected on the basis of several set values $\Phi$ according to an exemplary embodiment of the present invention.

DETAILED DESCRIPTION OF THE EMBODIMENTS

Figure 1:
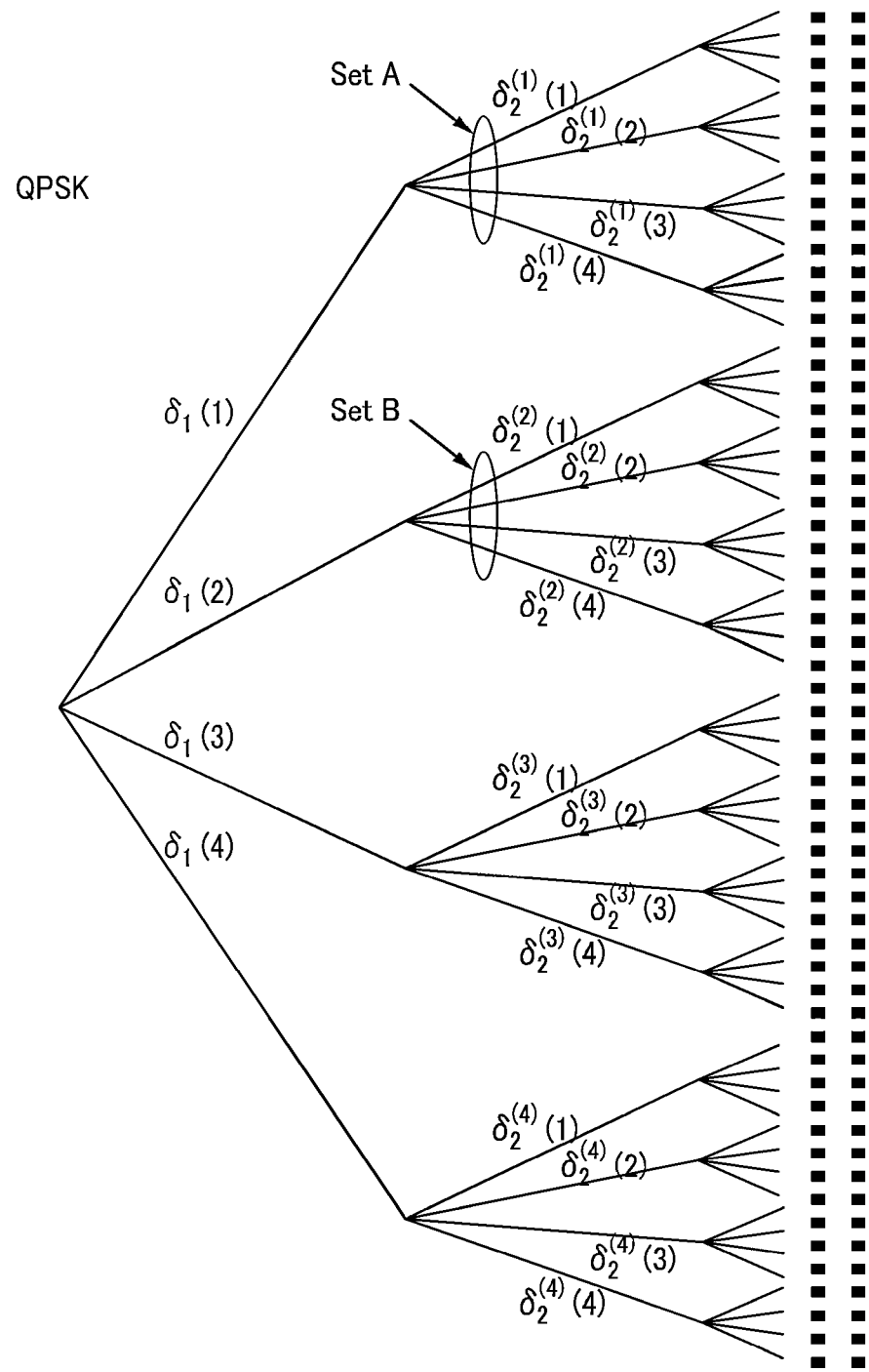
FIG. 1 is an exemplary diagram showing a constellation according to an exemplary embodiment of the present invention, and in particular, shows a constellation corresponding to QPSK.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

Hereinafter, exemplary embodiments of the present invention will be described with reference to the accompanying drawings.

A MIMO communication system according to an exemplary embodiment of the present invention includes a plurality of reception antennas and a plurality of transmission antennas, and the number of transmission antennas is the same as the number of reception antennas.

More specifically, the MIMO communication system includes $N_t$ transmission antennas and $N_r$ reception antennas. Transmission signals as signals transmitted through $N_t$ transmission antennas are received in each reception antenna through a fading channel. Reception signals can be expressed as follows.

$$y = Hx + n \quad \text{[Equation 1]}$$

Herein, y represents a reception signal vector, $H = [h_1, h_2, \ldots, h_{n_t}]$ represents a channel matrix, and $x = [x_1, x_2, \ldots, x_{n_t}]$ represents a reception signal vector. n, which is an N×1 matrix constituted by noise generated from a receiver, is the zero-mean complex additive white Gaussian noise (AWGN) of which the mean is 0 and the distribution is $N_0$.

Elements $x_i$ of the transmission signal vector x represent transmission symbols, and each transmission symbol is given as one element of a constellation. That is, $x_i \in S$, $i = 1, 2, \ldots, n_t$.

In order to detect the transmission symbol from the reception signal, when a signal received by an antenna having a predetermined order is determined as a detection target in accordance with a detection order, a weighting vector is calculated and a symbol that is a detection target is detected by multiplying the reception signal vector by the calculated weighting vector. Therefore, the detected symbol is subtracted from the reception signal vector.

By repeatedly performing the process, at an i-th symbol detection step in a case where all symbols detected until the step are subtracted from the reception signal vector, the reception signal vector can be expressed as follows.

$$y_i = y - \sum_{j=1}^{i-1} h_j \tilde{x}_j \quad \text{[Equation 2]}$$

$$= H \begin{bmatrix} e_{i-1} \\ [x]_{i:n_t} \end{bmatrix} + n$$

Herein, $y_j$ as a reception signal at the i-th step represents a reception signal from which all symbols detected until an i−1-th step are subtracted. $\tilde{x}_j$ represents a transmission symbol actually detected at a j-th step.

$[x]_{a:b}$ represents a sub-vector constituted by an a-th element to a b-th element of the transmission signal vector x. Therefore, $[x]_{i:n_t}$ is a sub-vector constituted by an i-th element to an $n_t$-th element of the transmission signal x.

$e_{i-1}$ is an error vector representing an error and can be defined as follows.

$$e_{i-1} = [e_1, e_2, \ldots, e_{i-1}]^T \quad \text{[Equation 3]}$$

$$= [x_1 - \tilde{x}_1, x_2 - \tilde{x}_2, \ldots, x_{i-1} - \tilde{x}_{i-1}]^T.$$

Now, for detection at the i-th step, an MMSE filter matrix is calculated as follows.

$$G_i = ([H]_{1:n_r, i:n_t})^H \left( \frac{1}{\gamma} I_{n_r} + H \Delta_i H^H \right)^{-1} \quad \text{[Equation 4]}$$

Herein, $G_i$ represents an MMSE filter matrix, and hereinafter is also referred to as a reception filter matrix for convenience of description. $I_{n_r}$ represents a unit matrix and $[H]_{a:b,c:d}$ represents a sub-matrix of H that is constituted by elements of rows a to b and columns c to d of matrix H. Herein, $\gamma$ represents a signal-to-noise ratio.

$\Delta_i$ represents a covariance matrix for an error caused by interference, and can be defined as follows.

$$\Delta_i = \frac{n_t}{P} E \left\{ \begin{bmatrix} e_{i-1} \\ [x]_{i:n_t} \end{bmatrix} [e_{i-1}^H, ([x]_{i:n_t})^H] \right\} \quad \text{[Equation 5]}$$

$$= \text{diag}\left[ \delta_1, \ldots, \delta_{i-1}, \underbrace{1, \ldots, 1}_{n_t - i + 1} \right]$$

Herein, $$\delta_j = \frac{n_t}{P} E\{|e_j|^2\}.$$

Herein, P represents transmission power and $\delta_j$ represents an expected value of an error caused when a j-th symbol is mis-determined as the detection target.

On the basis of the MMSE filter matrix calculated as above, the symbol to be detected at the i-th step is determined as follows.

A total of $n_t$ symbols are simultaneously transmitted by a transmitter and $i-1$ symbols are already detected until the $i-1$-th step during detecting the signal in the receiver. Therefore, one selected from $n_t-i+1$ symbols will now be detected. For this purpose, detection order is determined. The detection order can be determined by using various technologies known in the art.

If symbols detected up to now are $x_1, x_2, \ldots, x_{i-1}$, the following matrix $A_i$ is calculated in order to determine the detection order.

$$A_i := G_i[H]_{1:n_r, i:n_t} \qquad \text{[Equation 6]}$$
$$= ([H]_{1:n_r, i:n_t})^H \left(\frac{1}{\gamma} I_{n_r} + H\Delta_i H^H\right)^{-1} [H]_{1:n_r, i:n_t}.$$

Herein, the matrix $A_i$ is a matrix filtering a channel matrix on the basis of the reception filter matrix $G_i$, and hereinafter, is also referred to as "reordering matrix" for convenience of description.

Next, by finding a location of an element having the largest value among diagonal elements of the reordering matrix $A_i$, the location is represented by $t$, and at the current i-th step, $x_t$ which is a t-th symbol is detected.

As described above, when the detection order is determined, a symbol at the corresponding location is detected. That is, by multiplying $g_t$ which is a t-th column of the matrix $G_i$ acquired above by the reception signal $y_i$ according to Equation 2, $x_t$ which is a t-th symbol is detected.

$$\tilde{x}_t = g_t y_i \qquad \text{[Equation 7]}$$

As such, after the symbol detection at the i-th step is performed, the transmission symbol detected at the i-th step is subtracted from the reception signal, and thereafter, an (i+1)-th step is again performed and the above process is repeated.

In the exemplary embodiment of the present invention, a reception filter matrix G and a reordering matrix A at the current step are acquired on the basis of the matrix calculated at the previous step as follows without calculating the reception filter matrix G and the reordering matrix A described above at each step of performing the signal detection after the (i+1)-th step in order to reduce implementation complexity of the signal detection method.

That is, as described at the first symbol detection step (i.e., i-th step), the reception filter matrix $G_i$ and the reordering matrix $A_i$ are each calculated. However, from the step (i.e., (i+1)-th step), a reception filter matrix $G_{i+1}$ and the reordering matrix $A_{i+1}$ to be used at the (i+1)-th step are acquired as follows on the basis of the reception filter matrix $G_i$ and the reordering matrix $A_i$ calculated at the i-th step.

$$G_{i+1} = [G_i]_{2:n_t-i+1, 1:n_r} - u_{i+1}^H [G_i]_{1,1:n_r} \qquad \text{[Equation 8]}$$

$$A_{i+1} = [A_i]_{2:n_t-i+1, 2:n_t-i+1} - u_{i+1}^H [A_i]_{1, 2:n_t-i+1} \qquad \text{[Equation 9]}$$

Herein, $$u_{i+1} = \frac{([A_i]_{1, 2:n_t-i+1})^H}{(\delta_i - 1)^{-1} + [A_i]_{1,1}}.$$

The calculated matrices $G_{i+1}$ and $A_{i+1}$ are the same as the values acquired by Equations, 4 and 6.

Consequently, according to the exemplary embodiment of the present invention acquiring the reception filter matrix $G_{i+1}$ and the reordering matrix $A_{i+1}$ to be used at the (i+1)-th step on the basis of the matrices $G_i$ and $A_i$ calculated at the i-th step, the implementation complexity is reduced while the same performance as the existing method of calculating the matrices G and A at each step on the basis of Equations 4 and 6 is secured.

In particular, when the matrix calculating method according to the exemplary embodiment of the present invention is compared with the existing method, the implementation complexity is reduced to approximately 67% (for example, a case of using four transmission and reception antennas and using quadrature phase shift keying (QPSK)) or approximately 64% (for example, a case of using four transmission and reception antennas and using 16-quadrature amplitude modulation (QAM)).

Next, a process of detecting a signal in accordance with a constellation according to an exemplary embodiment of the present invention using the matrix calculating method will be described.

As described above, in a case where the symbol is consecutively detected, when an error is generated at the previous symbol detection step, the error influences the next signal detection step, thereby increasing a possibility that the error will be generated. In particular, an error at any one step causes the amount of interference to be increased at the time of performing the detection at the next step. Therefore, in the exemplary embodiment of the present invention, in order to prevent the error, several constellations in the vicinity of the candidates acquired on the constellation are acquired at the time of detecting the signal and final detection is performed by considering all constellations acquired at the final step.

More specifically, first, when an M-array constellation is assumed and a detection trellis diagram is drawn, the number of all transitions that are possible at the i-th step is $M^i$.

FIG. 1 is an exemplary diagram showing a constellation according to an exemplary embodiment of the present invention, and in particular, shows a constellation corresponding to QPSK.

For example, in FIG. 1, the number of all transitions that are possible at the second step is 16. All $M_i$ transitions may be re-divided into $M_{i-1}$ transition groups, and each transition group has M transitions.

In the exemplary embodiment of the present invention, during the symbol detection at the i-th step, a plurality of constellation symbol candidates are selected from all transmission symbols vectors that can be transmitted as a predetermined symbol. More specifically, at the i-th symbol detection step, $L_{j,i}$ transitions are selected from M transitions of a j-th transition group ($1 \leq j \leq M^{i-1}$). At this time, $L_{j,i}$ symbols corresponding to the selected transitions are symbols having the minimum signal to noise plus interference ratio (hereinafter referred to as "SINR") at the next step.

In order to select $L_{j,i}$ constellations symbol candidates (or transitions corresponding thereto) having the maximum SINR from total M selectable constellation symbol candidates (alternatively, transitions corresponding thereto) in each transitions group, an $SINR_{j,i+1}$ which is an SINR at the next step should be calculated for all M transitions, and the $SINR_{j,i+1}$ can be calculated as follows.

$$SINR_{j,i+1} = h_{i+1}^H \left(\frac{1}{\gamma} I_{n_r} + H^{(i+1)} \Delta_{j,i+1}^{(i+1)} (H^{(i+1)})^H\right)^{-1} h_{i+1} \qquad \text{[Equation 10]}$$

Herein, $\Delta_{j,i+1}^{<i+1>}$ is a diagonal matrix and is expressed as follows.

$$\Delta_{j,i+1}^{<i+1>} = \text{diag}\left[\delta_1^{(j)}, \ldots, \delta_{i-1}^{(j)}, \delta_i^{(j)}(m), \underbrace{1, \ldots, 1}_{n_t-i-1}\right] \quad \text{[Equation 11]}$$

$$\delta_i^{(j)}(m) = \frac{n_t}{P} E\{(x_i - \hat{x}_i^{(j)}(m))^2\} \quad \text{[Equation 13]}$$

$$= \frac{n_t}{P} \sum_{x \in S} |x - \hat{x}_i^{(j)}(m)|^2 Pr(x|\tilde{x}_j),$$

$$m = 1, \ldots, M; \hat{x}_i^{(j)}(m) \in S.$$

Herein, P represents the transmission power, and $\delta_i^{(j)}(m)$ represents an expected value of an error caused when an m-th transition among M transitions of the j-th transition group ($1 \leq j \leq M^{i-1}$) is mis-determined as a detection target at the i-th symbol detection step. Hereinafter, for convenience of description, $\delta_i^{(j)}(m)$ is referred to as "error expected value".

First, a constellation symbol having the maximum SINR value is $\hat{x}_t$ of Equation 7 determined and calculated by Equations 8 and 9.

However, in order to find $L_{j,i}$ constellation symbol candidates including the symbol, the SINR for all transitions should be calculated as shown in Equation 10. However, in a case of directly calculating the SINR, the complexity is very high, such that it is difficult to implement the direct calculation in an actual system. Therefore, in the exemplary embodiment of the present invention, the SINR is acquired by the following theorem instead of directly calculating the SINR according to the above-mentioned equation.

Theorem 1: $L_{j,i}$ constellation symbol candidates having the maximum SINR calculated in Equation 10 are $L_{j,i}$ constellation symbol candidates having the minimum $\delta_i^{(j)}(m)$ value.

By using the theorem, $L_{j,i}$ constellation symbol candidates having the maximum SINR at the next step are found by using only the error expected value $\delta_i^{(j)}(m)$ without actually calculating the SINR at the next step. That is, among error expected values $\delta_i^{(j)}(m)$ for all M transitions, $L_{j,i}$ transitions are selected and set as the constellation symbol candidates in the order in which the smaller error expected value is first selected. Accordingly, $L_{j,i}$ constellation symbol candidates are acquired. For example, in a case of QPSK, when four constellation dots, that is, m=1, 2, 3, 4 and error expected values acquired for the constellation dots (transitions) are 2.3, 1.2, 4.5, 0.5 in sequence, the set number $L_{j,i}$ is set as 2. In this case, by selecting symbols in which values of m are 4 and 2 in the order of the smaller error expected value, the selected symbols are set as the constellation symbol candidates.

Meanwhile, $Pr(x|\tilde{V}_j)$ should be calculated in order to calculate the error expected value $\delta_i^{(j)}(m)$. $Pr(x|\tilde{x}_j)$ as a conditional error probability represents a probability that x will be a transmission signal when $\tilde{x}_j$ is detected. $Pr(x|\tilde{x}_j)$ Herein, since $\tilde{x}_j$ is determined through MMSE filtering on the basis of the reception filter matrix $G_i$ according to Equation 8, the conditional error probability $Pr(x|\tilde{x}_j)$ is calculated on the basis of the reception filter matrix $G_i$ according to Equation 8. The calculation process is known to the art. Therefore, a detailed description thereof will be omitted herein.

As described above, the conditional error probabilities of the corresponding transitions are calculated and the error expected values are calculated on the basis of the calculated probabilities, and thereafter, $L_{j,i}$ transitions are selected from m transitions on the basis of the calculated error expected values and set as the constellation symbol candidates as described above.

When the symbol candidate vectors are selected from all the transmission symbols in the same manner as above, the number of all selected constellation symbol candidate vectors at the final step (i.e., i=nt) is $$\sum_{j=1}^{M^{n_t-1}} L_{j,n_t}.$$

Next, a Euclidean distance from the reception signal is calculated for all the selected constellation symbol candidate vectors, and one constellation symbol vector is finally selected from all the constellation symbol candidate vectors on the basis of the calculated Euclidean distances. For example, a constellation symbol vector having the minimum Euclidean distance is selected.

Meanwhile, in the signal detection method according to the exemplary embodiment of the present invention, which is implemented as described above, the following method is used in order to efficiently select the number $L_{j,i}$ of constellation symbol candidates.

At each symbol detection step, the Euclidean distance acquired by a predetermined scheme (for example, improved MMSE-SIC scheme) is acquired with respect to each of all symbol vectors which is transmissible for a predetermined symbol, that is, all transitions. In addition, a corresponding transition is selected when a Euclidean distance for a predetermined transition is smaller than a given set value $\Phi$ (this value is a constant) through comparison, and the corresponding transition is not selected when the distance is larger than the given set value $\Phi$. The number of transitions selected by performing the process with respect to all the transitions is $L_{j,i}$.

Since setting the number $L_{j,i}$ does not need to be performed in real time, the number $L_{j,i}$ is previously calculated by the above-mentioned method and may be stored in a memory, etc. Therefore, a process for calculating the number $L_{j,i}$ is not performed at the time of detecting the signal.

Meanwhile, while setting the number $L_{j,i}$, when the set value $\Phi$ increases, more transitions are selected, such that a value of $L_{j,i}$ increases. In this case, since more constellation symbol candidates are selected, signal detection performance is improved, but at the final symbol detection step, a value of the number $$\sum_{j=1}^{M^{n_t-1}} L_{j,n_t}$$

of all the constellation symbol candidate vectors increases. Since Euclidean distances are calculated with respect to many constellation symbol candidate vectors corresponding to $$\sum_{j=1}^{M^{n_t-1}} L_{j,n_t}$$

that is increased as a result, the complexity may increase.

On the contrary, when the set value $\Phi$ decreases, less transitions are selected, such that a value of $L_{j,i}$ decreases. In this case, at the final symbol detection step, less constellation symbol candidates are selected, such that detection performance may be deteriorated, but at the final symbol detection step, a value of the number $$\sum_{j=1}^{M^{n_t}-1} L_{j,n_t}$$

of all the constellation symbol candidate vectors decreases. Therefore, the number of times at which the Euclidean distance should be calculated with respect the constellation symbol candidate vectors decreases to thereby decrease the complexity.

Accordingly, in the exemplary embodiment of the present invention, the set value Φ is appropriately selected such that the number $L_{j,i}$ has an optimal value, thereby decreasing the complexity of the signal detection method while maintaining the detection performance to some extent. The number $L_{j,i}$ is referred to as "optimal number" for convenience of description, and may have different values for each symbol depending on each detection step.

FIG. 2 is an exemplary diagram showing the numbers $L_{j,i}$ selected on the basis of several set values Φ according to an exemplary embodiment of the present invention. More specifically, the numbers $L_{j,i}$ are shown, which are selected depending on a value of a set value Φ in the QPSK constellation {a+bj:a,b=±1} and the 16-QAM constellation {a+bj:a, b=±1, ±3}.

In particular, when using the method according to the exemplary embodiment of the present invention, the complexity is approximately ⅓ smaller than the known method, that is, the complexity is reduced to approximately ⅔ of the known method. Further, when the set value Φ for selecting the symbol candidates is appropriately selected, substantially the same performance as the optimal method can be achieved with low complexity.

Next, an apparatus for signal detection according to an exemplary embodiment of the present invention, which adopts the signal detection method, will be described.

Figure 3:
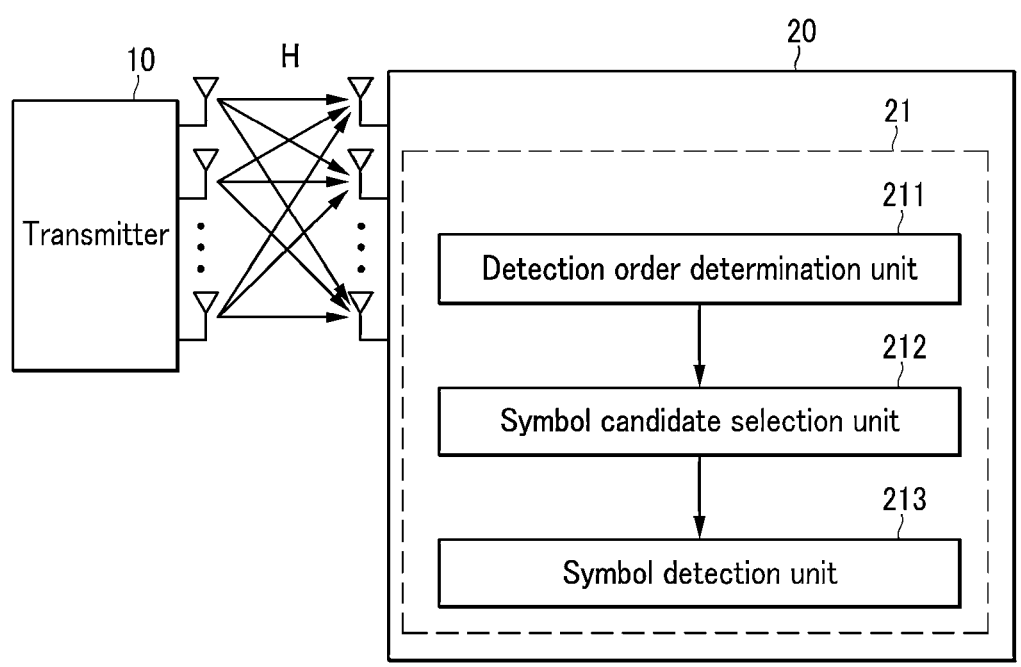
FIG. 3 is a diagram showing a structure of an apparatus for signal detection according to an exemplary embodiment of the present invention.

FIG. 3 is a diagram showing a structure of an apparatus for signal detection according to an exemplary embodiment of the present invention.

As shown in FIG. 3, the signal detection apparatus according to the exemplary embodiment of the present invention includes a transmitter 10 transmitting signals through N transmission antennas, and a receiver 20 that communicates through N reception antennas.

Distortion of signals received through the reception antennas of the receiver 10 generated by multi-path fading of a MIMO channel may be preferentially compensated, and the reception signals are transmitted to a signal detector 21.

The signal detector 21 includes a detection order determination unit 211, a symbol candidate selection unit 212, and a symbol detection unit 213.

The detection order determination unit 211 repeatedly performs a step of determining a location of a symbol to be detected from the reception signals inputted through each reception antenna. In particular, a reception filter matrix and a reordering matrix for determining the position of the symbol are calculated only at the first step, and from the subsequent steps, a reception filter matrix and a reordering matrix at the current step are calculated on the basis of the matrices calculated at the previous step so as to reduce time according to the calculation of the matrices and reduce the complexity of the calculation process.

The symbol candidate selection unit 212 selects symbol candidate vectors on the constellation on the basis of the position of the symbol determined for each step. In particular, in order to more accurately detect the symbol while reducing the complexity during the selection process, the SINR is not calculated with respect to all transitions on the constellation, an error expected value $\delta_i^{(j)}(m)$ is calculated on the basis of a theorem that "$L_{j,i}$ constellation symbol candidates having the maximum SINR are $L_{j,i}$ constellation symbol candidates having the minimum $\delta_i^{(j)}(m)$ value", and symbol candidate vectors having the optimal number having the maximum SINR at the next step are selected on the basis of the calculated $\delta_i^{(j)}(m)$. Herein, the optimal number $L_{j,i}$ previously set through a predetermined process may be stored in the symbol candidate selection unit 212.

The symbol detection unit 213 calculates the Euclidean distance from the reception signal with respect to all the constellation symbol candidate vectors summing up the symbol candidate vectors of the optimal number for each step. In addition, the constellation symbol candidate having the minimum value is detected as the final symbol vector. As a result, the final symbol vector is detected for each of the transmission symbols.

Performing the signal detection method according to the exemplary embodiment of the present invention will now be described on the basis of the signal detection apparatus having the above-mentioned structure.

Figure 4:
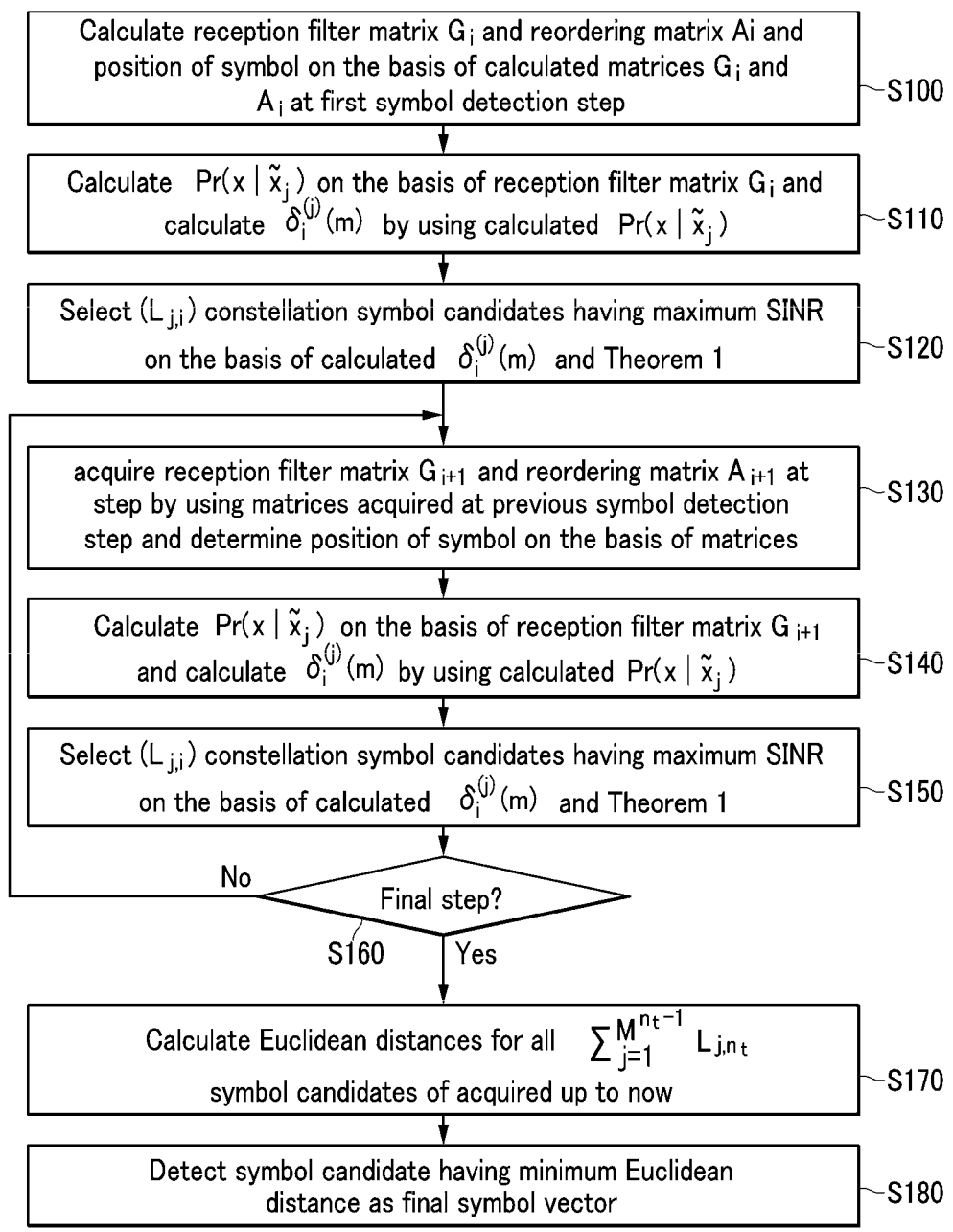
FIG. 4 is a flowchart of a method for signal detection according to an exemplary embodiment of the present invention.

FIG. 4 is a flowchart of a method for signal detection according to an exemplary embodiment of the present invention.

First, at a first symbol detection step (i.e., i-th step), a position of a symbol to be detected is determined. For this purpose, as described above, a reception filter matrix $G_i$ and a reordering matrix $A_i$ for determining a detection order are calculated on the basis of Equations 4 and 6. In addition, on the basis of the calculated reordering matrix $A_i$, the position of the symbol to be detected is determined (S100).

In addition, in order to detect the determined position without an error, constellation points of a predetermined number are acquired, which include constellation points that are candidate symbols on a constellation. That is, conditional error probabilities $Pr(x|\tilde{x}_j)$ are calculated with respect to each constellation point on the basis of the reception filter matrix $G_i$ according to Equation 4, and error expected values $\delta_i^{(j)}(m)$ are calculated based on the conditional error probabilities $Pr(x|\tilde{x}_j)$ (S110).

In addition, according to Theorem 1 described above, on the basis of the calculated error expected values $\delta_i^{(j)}(m)$, $L_{j,i}$ constellation symbol candidates having the maximum SINR at the subsequent step are found among the constellation points (S120).

As such, after the symbol detection to find $L_{j,i}$ constellation symbol candidates for a predetermined transmission symbol is performed at the first step, the symbol detection is performed as follows at a second step (i.e., (i+1)-th step).

In order to determine the position of the symbol to be detected at the second symbol detection step, the position of the symbol is determined not by calculating the reordering matrix $A_{i+1}$, but by using the reordering matrix $A_i$ calculated at the previous step (herein, the first step). That is, as described above, a reception filter matrix $G_{i+1}$ to be used at the current step is acquired on the basis of the matrices $G_i$ and $A_i$ calculated at the previous step as shown in Equations 8 and 9, and the position of the symbol is determined by acquiring $A_{i+1}$ on the basis of the matrix (S130).

In addition, in order to detect the symbol at the determined position, the conditional error probability $Pr(x|\tilde{x}_j)$ is calculated with respect to each constellation point on the basis of the reception filter matrix $G_{i+1}$ according to Equation 8, and the error expected values $\delta_i^{(j)}(m)$ are calculated on the basis of the calculated conditional error probability $\Pr(x|\tilde{x}_j)$ (S140). In addition, according to Theorem 1 described above, on the basis of the calculated error expected values $\delta_i^{(j)}(m)$, $L_{j,i}$ constellation symbol candidates having the maximum SINR at the subsequent step are found among the constellation points (S150).

At the subsequent steps, in the same manner as the second symbol detection step, while positioning the symbols by simply acquiring the matrix A for positioning the symbol at the current step by using the matrices G and A acquired at the previous step, $L_{j,i}$ constellation symbol candidates are found on the basis of the determined positions of the symbols.

Meanwhile, in a case where the current step is the final step (i.e., $n_t$-th step) (S160), Euclidean distances from the reception signal are calculated with respect to $$\sum_{j=1}^{M^{n_t}-1} L_{j,n_t}$$

constellation symbol candidates found through the symbol detection steps up to now (S170).

In addition, a symbol candidate vector having the minimum distance among the Euclidean distances calculated with respect to the transmission symbols is determined as the final symbol vector for the corresponding symbol (S180).

According to the exemplary embodiment of the present invention, the method and apparatus for signal detection can be provided, which have substantially the same performance as the optimal scheme while achieving low complexity in a MIMO system. Accordingly, in actual system implementation, it is possible to reduce system implementation cost with low complexity.

Figure 5:
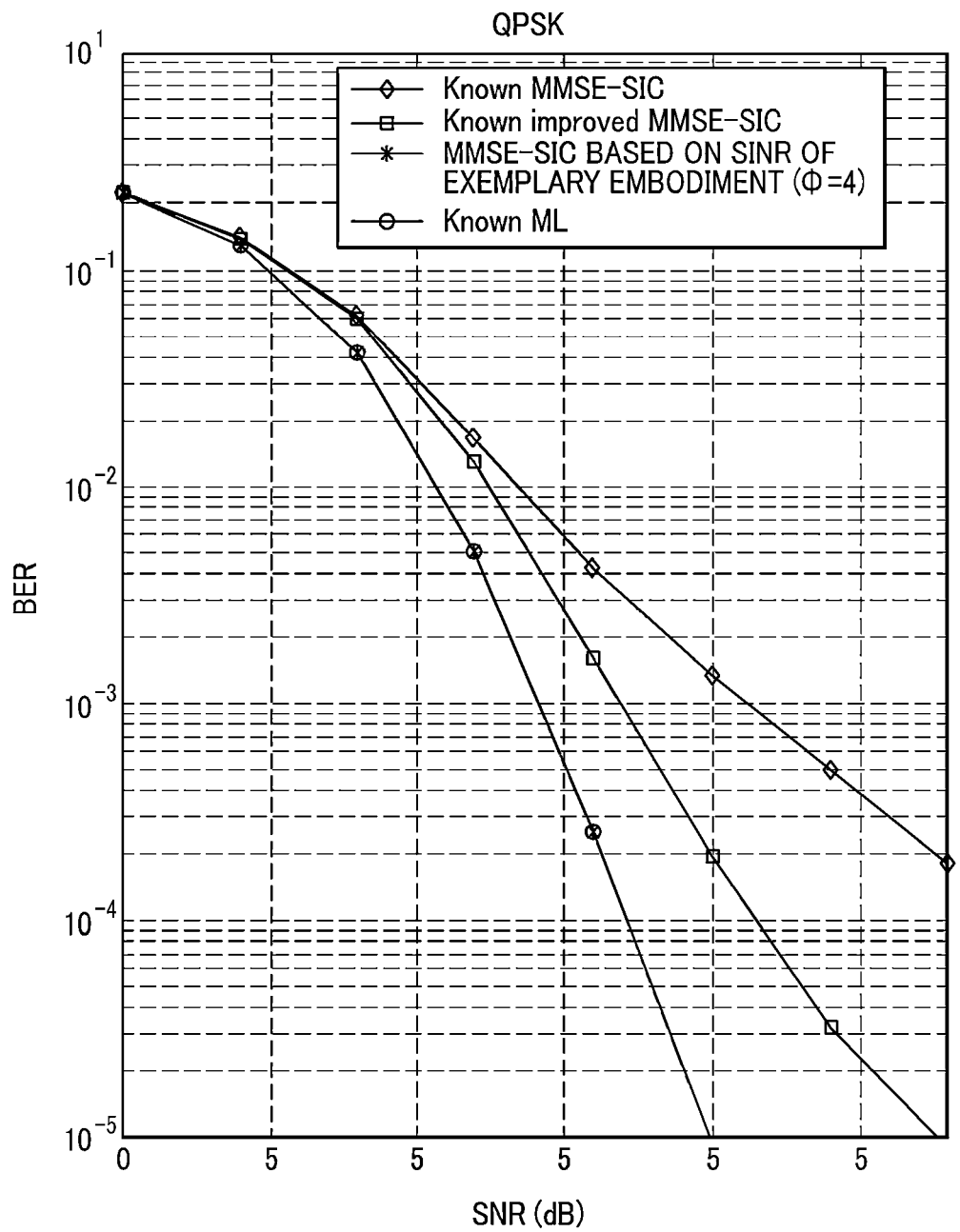
FIG. 5 is a graph comparing performances of a signal detection method according to an exemplary embodiment of the present invention with known schemes with each other.

FIG. 5 is a graph showing the performance of a method for signal detection according to an exemplary embodiment of the present invention. In a case of the QPSK constellation in the MIMO system having four transmission antennas and four reception antennas, FIG. 5 is a graph comparing performances of the existing signal detection methods, that is, the MMSE-SCI scheme, the improved MMSE-SIC scheme, and the ML scheme, and the signal detection method (herein, $\Phi=4$) according to the exemplary embodiment of the present invention, with each other.

Referring to FIG. 5, the signal detection method according to the exemplary embodiment of the present invention provides substantially the same performance as the known ML scheme. In this case, the complexity of the signal detection method according to the exemplary embodiment of the present invention is approximately 7% of the ML scheme in comparison with the ML scheme, and approximately 42% of the known improved MMSE-SIC scheme in comparison with the known improved MMSE-SIC scheme. That is, the signal detection method according to the exemplary embodiment of the present invention is still lower in complexity and still better in performance than the known improved MMSE-SIC scheme.

According to an exemplary embodiment of the present invention, a method and an apparatus for signal detection can be provided, which have substantially the same performance as the optimal signal detection scheme while achieving low complexity in a MIMO system. Further, it is possible to reduce system implementation cost due to low complexity.

The above-mentioned exemplary embodiments of the present invention are not embodied only by an apparatus and/or method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for signal detection in a multi-input multi-output communication system receiving signals transmitted through a plurality of transmission antennas by using a plurality of reception antennas, the method comprising:
   detecting symbol candidate vectors with respect to transmission symbols transmitted through the plurality of transmission antennas on the basis of the signals received through the plurality of reception antennas;
   calculating Euclidean distances with respect to all the detected symbol candidate vectors; and
   detecting a vector having a minimum Euclidean distance among the symbol candidate vectors as a final symbol vector for each of the transmission symbols, wherein the detecting of the symbol candidate vectors includes:
      determining a symbol to be detected at present; and
      selecting symbol candidates of a predetermined number and detecting the selected symbol candidates as the symbol candidate vectors on the basis of error expected values of the symbol candidates among all transmissible symbol candidates on a constellation with respect to the determined symbol,
   wherein the error expected values are error expected values for errors generated when a corresponding symbol is mis-determined as a detection target,
   wherein the determining of the symbol to be detected at present includes:
      determining the symbol based on a reception filter matrix used to determine a position of the symbol and based on a reordering matrix calculated according to a channel matrix representing channel characteristics between the plurality of reception antennas and the plurality of transmission antennas, and
   wherein the determining of the symbol based on the reception filter matrix and based on the reordering matrix includes:
      calculating the reception filter matrix used to determine the position of the symbol and calculating the reordering matrix by applying the calculated reception filter matrix to the channel matrix representing channel characteristics between the plurality of reception antennas and the plurality of transmission antennas;
      analogizing the reception filter matrix and the reordering matrix for the symbol to be detected at present on the basis of the reception filter matrix and the reordering matrix used at the time of determining the position of a previous symbol detected in a case where the symbol to be detected at present is not a first symbol.

2. The method of claim 1, wherein,
in determining the symbol to be detected at present, an element having the largest value is selected from among diagonal elements constituting the reordering matrix and a transmission symbol that is transmitted through the plurality of transmission antennas corresponding to the element and is received through the plurality of reception antennas is determined as the symbol to be detected.

3. The method of claim 1, wherein the detecting of the selected symbol candidates as the symbol candidate vectors further includes:
calculating error expected values with respect to all transmissible symbol candidates on the constellation; and
selecting symbol candidates of a predetermined number in an order of the smallest expected value from all the transmissible symbol candidates and detecting the symbol candidates as the symbol candidate vectors.

4. The method of claim 1, wherein the error expected values are calculated from conditional probabilities calculated on the basis of the reception filter matrix.

5. A method for signal detection in a multi-input multi-output communication system receiving signals transmitted through a plurality of transmission antennas by using a plurality of reception antennas, the method comprising:
determining a symbol to be detected at present in order to detect transmission symbols transmitted through the plurality of transmission antennas, on the basis of the signals received through the plurality of reception antennas; and
selecting at least one symbol candidate vector from among all transmissible symbol candidates on a constellation with respect to the determined symbol,
wherein the determining of the symbol to be detected at present includes:
determining the symbol based on a reception filter matrix used to determine a position of the symbol and based on a reordering matrix calculated according to a channel matrix representing channel characteristics between the plurality of reception antennas and the plurality of transmission antennas;
calculating the reception filter matrix used to determine the position of the symbol and calculating the reordering matrix by applying the calculated reception filter matrix to the channel matrix representing channel characteristics between the plurality of reception antennas and the plurality of transmission antennas
analogizing the reception filter matrix and the reordering matrix for the symbol to be detected at present on the basis of the reception filter matrix and the reordering matrix used at the time of determining the position of a previous symbol in a case where the symbol to be detected at present is not a first symbol.

6. The method of claim 5, further comprising:
repeatedly performing determining the symbol to be detected at present and selecting corresponding symbol candidate vectors as many times as the number of transmission symbols;
calculating Euclidean distances for all the selected symbol candidate vectors; and
detecting a vector having the minimum Euclidean distance among the symbol candidate vectors for the transmission symbols as a final symbol vector for a corresponding transmission symbol.

7. The method of claim 5, wherein, in selecting the at least one symbol candidate vector, a predetermined number of the at least one symbol candidate vector is selected on the basis of error expected values of the symbol candidates, the error expected values being error expected values for errors generated when a corresponding symbol is mis-determined as a detection target, among all transmissible symbol candidates on the constellation with respect to the determined symbol.

8. The method of claim 5, further comprising:
acquiring Euclidean distances with respect to all transmissible symbol vectors for a predetermined symbol;
performing a process in which, when a Euclidean distance of a predetermined symbol vector is smaller than a given set value, selecting a corresponding symbol vector, and when the Euclidean distance is larger than given set value, not selecting the corresponding symbol vector, with respect to all symbol vectors; and
setting a number of symbol vectors selected as a result of performing the process with respect to all the symbol vectors as a predetermined number for a symbol.

9. An apparatus for signal detection in a multi-input multi-output communication system receiving signals transmitted through a plurality of transmission antennas by using a plurality of reception antennas, the apparatus comprising:
a detection order determination unit determining a symbol to be currently detected in order to detect transmission symbols transmitted through the plurality of transmission antennas on the basis of the signals received through the plurality of reception antennas;
a symbol candidate selection unit selecting symbol candidate vectors of a predetermined number on the basis of error expected values of symbol candidates from among all transmissible symbol candidates on a constellation with respect to the determined symbol; and
a symbol detection unit detecting a vector having a minimum Euclidean distance among the symbol candidate vectors when the symbol candidate vectors of an optimal number are selected for all transmission symbols via the operation of the detection order determination unit and the symbol candidate selection unit,
wherein the detection order determination unit calculates a reception filter matrix and a reordering matrix used to determine the position of a symbol to be detected in a first symbol detection step and determines the symbol to be detected in the first symbol detection step on the basis of the calculated reception filter matrix and the reordering matrix, and analogizes a reception filter matrix and a reordering matrix for a symbol to be currently detected on the basis of the reception filter matrix and the reordering matrix used at the time of determining the position of a previous symbol when the symbol to be currently detected is not a first symbol.

10. The apparatus of claim 9, wherein the error expected values are error expected values for errors generated when a corresponding symbol is mis-determined as a detection target.

11. The apparatus of claim 9, wherein the symbol candidate selection unit calculates error expected values with respect to all the transmissible symbol candidates on the constellation, selects symbol candidates of an optimal number in an order of the smallest expected value from all the transmissible symbol candidates, and sets the selected symbol candidates as the symbol candidate vectors.

* * * * *